H. C. ROOT.
MILK HEATER.
APPLICATION FILED FEB. 6, 1909.
939,636.
Patented Nov. 9, 1909.
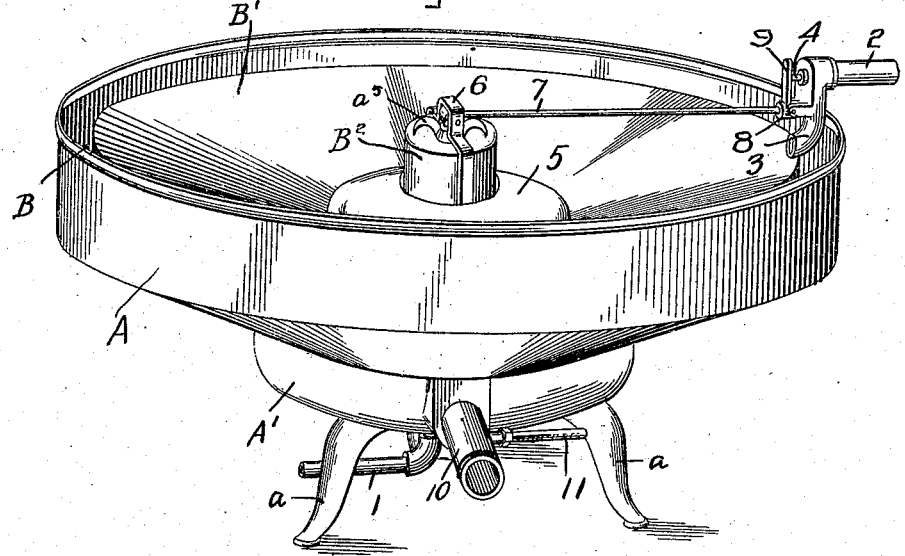
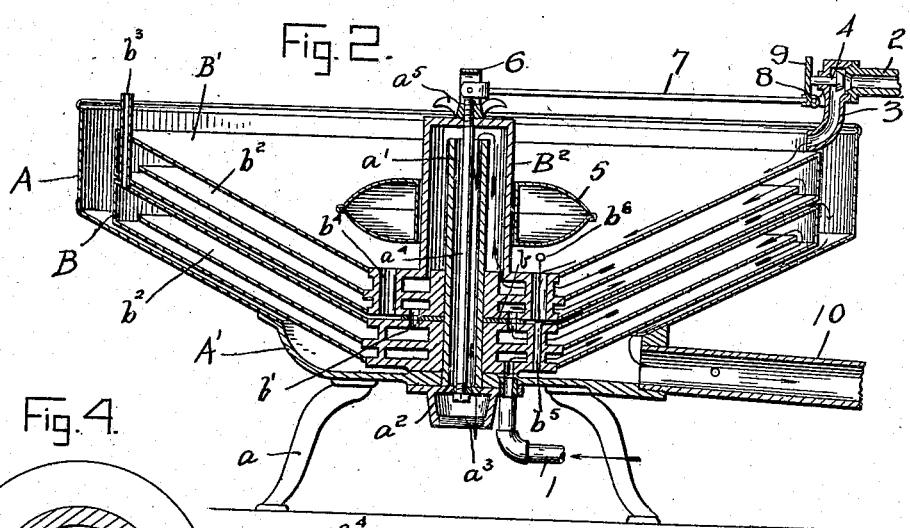
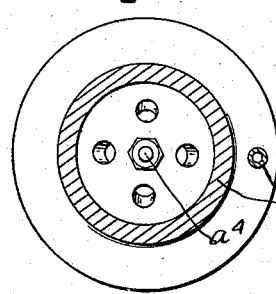
Witnesses
C. K. Reichenbach
L. A. Price
Inventor
Henry C. Root,
By E. W. Bradford
Attorney

UNITED STATES PATENT OFFICE.

HENRY C. ROOT, OF WESTGROVE, PENNSYLVANIA.

MILK-HEATER.

939,636.  Specification of Letters Patent.  Patented Nov. 9, 1909.

Application filed February 6, 1909. Serial No. 476,469.

*To all whom it may concern:*

Be it known that I, HENRY C. ROOT, a citizen of the United States, residing at Westgrove, in the county of Chester and State of Pennsylvania, have invented certain new and useful Improvements in Milk-Heaters, of which the following is a specification.

My said invention consists in an improved construction of heaters designed especially for heating milk, whereby a very efficient apparatus for the purpose is provided and one by which the temperature desired for the milk may be secured without in any way injuring its nutritious qualities, all as will be hereinafter more fully described and claimed.

Referring to the accompanying drawings which are made a part hereof, and on which similar reference characters indicate similar parts, Figure 1 is a perspective view of a milk heater embodying my said invention, Fig. 2 a central vertical section through the same, Fig. 3 a detail view of a portion of Fig. 2 on an enlarged scale, and Fig. 4 a section looking in the direction indicated by the arrows from the dotted line 4—4 in Fig. 3.

In said drawings the portions marked A represent the main body of the apparatus and B, B', hollow heating cones mounted therein.

The body A is supported upon legs $a$ and is of a size suitable for the purpose for which it is designed, different sizes being provided for machines of different capacities. Said body is preferably cylindrical, and its bottom is mainly in the form of an inverted frustum of a cone. A central receiving chamber A' is provided at the center of its bottom and a central opening is formed therethrough in which a tube $a'$ is mounted by a tight joint, preferably screw-threaded, as shown in Fig. 3. Said tube extends nearly to the top of said body. Around the lower end of said tube is mounted a fitting $a^2$ with which a waste pipe may be connected at its screw-threaded lower end $a^3$ for the outflow of the heating agent. The upper portion of said fitting is a plate that covers the lower end of tube $a'$ and is formed with perforations (see especially Fig. 4) through which the heating agent may discharge. A central clamping rod extends up through a central perforation in the top plate of said fitting $a^2$, through the tube $a^4$ and through a perforation in the top of drum $B^5$, above which it is provided with a thumb-nut $a^5$.

The heating cones B and B' are similarly formed and are each provided with central hubs mounted one upon the other around the central tube $a'$, packing rings $b$ being inserted between them to make tight joints, and perforations $b'$ being formed in their adjacent faces and arranged to register to establish communication from one to the other. Each cone is provided with a partition $b^2$ which extends from its hub nearly to its periphery midway between the top and bottom plate of each cone. The cones proper and partitions therein are preferably of spun copper and the hubs cast, of the form shown.

An air, or vent, tube $b^3$ extends from the interior of said cones to the outside above the level of the liquid in the vessel, to guard against air pressure interfering with the circulation of the heating agent. Apertures $b^4$ extend through the hub of the upper cone to the space between said cones. A drain hole is formed through the hub on the lower cone in which is mounted a plug $b^5$ provided with a handle $b^6$, projecting up through one aperture $b^4$ in the hub of the upper cone, by which said plug may be removed and the drain passage opened to permit of draining out the milk preparatory to washing and cleaning the apparatus. The hub of the upper cone is formed with a drum $B^2$ which extends upwardly and is adapted to incase the upper end of the central tube $a'$.

In operation, the heating agent, such as hot water, enters through the inlet pipe 1, which communicates through a suitable perforation with the space in the lower heating cone beneath the partition $b^2$ therein. Said heating agent, being under pressure, flows up through the space between the bottom plate of the cone and its partition, around the outer edge of said partition, back to the center, and up through the apertures $b'$, provided for the purpose, into the space in the upper cone beneath the partition $b^2$ therein, then out to the edge of the cone, over the edge of said partition, back to the center of the cone and up through apertures into the chamber between the drum $B^2$ and the center tube $a'$ flowing up over the top of said center tube and discharging through the waste pipe (not shown) attached to the fitting $a^2$. The milk to be heated enters through a pipe 2, having a nozzle 3, which hangs over the edge of the body A containing the heater, the discharge from said pipe into said nozzle being controlled by a valve 4 operated by a float 5 which is adapted to slide vertically on the drum $B^2$ and is connected by a yoke 6, to a rod 7, which is pivoted on a pivot 8 to one side of the nozzle 3 and has an upwardly projecting finger 9 which bears against the stem of said valve 4, which stem projects through an aperture in the side of said nozzle, as clearly shown in Fig. 2. It will be readily seen that as said float 5 rises or falls the finger 9 is rocked on its pivot to adjust said valve 4 toward or away from its seat.

The milk will flow into the upper cone B' freely through said nozzle until the float 5 is lifted to the point where the flow of said milk will be cut off, or regulated so that it will just equal the out-flow through the apparatus. The milk spreads over the surface of cone B' and passes through the aperture $b^4$, near the center of the cone, to the space between the cones B and B' where it is compelled to flow in a thin sheet, by reason of the narrow space, out over the edge of said cone and down into the space between the bottom plate of the cone B and the bottom of the vessel into the chamber A', formed to receive it, and out through the discharge pipe 10.

By a proper adjustment of the valves it will be readily seen that the flow of the milk through the apparatus can be so regulated that it will be heated to just the temperature desired, and without subjecting it to a temperature so high that the fat globules in the milk are destroyed. The discharge of the milk being at the same point of the apparatus as the inlet of the heating agent, it will be seen that as the milk approaches its discharge point it is continually brought in contact with higher temperature until, at the point of discharge, it should be of approximately the same temperature as the heating agent at its entrance. When introduced into the apparatus it thus becomes an easy matter, by regulating the temperature of the heating agent, to regulate the temperature at which the milk shall be heated, and to avoid such excessive high temperature as would injure the milk in such treatment. On the milk outlet pipe 10 I show a thermometer holder 11 which may be there mounted and by which the temperature of the milk, as it is discharged, can be determined.

When it is desired to clean the apparatus it can be readily taken apart by disconnecting the flow, draining the milk by lifting plug $b^5$, unscrewing nut $a^5$ on clamping rod $a^4$, lifting out the cones, and subjecting the parts to a thorough cleaning.

Having thus fully described my said invention, what I claim as new, and desire to secure by Letters Patent, is:

1. A liquid heater comprising a body in the form of a vessel having a bottom tapered toward its center, hollow cones mounted within said vessel and arranged with a narrow space between them and also between the lower cone and the bottom of the vessel and formed with an internal passage-way for the heating agent adjacent to both their bottom and top surfaces, an inlet for the liquid to be heated arranged to discharge through passage-ways formed in the hub of said upper cone, through the channel formed between the cones and between the lower cone and the bottom of the vessel, substantially as set forth.

2. A milk heater comprising the outside casing, or vessel, with a tapered bottom having a central receiving chamber a discharge pipe leading therefrom, a series of hollow cones mounted within said body one above the other and arranged with a narrow passage-way between the lower cone and the bottom of the vessel and also with like narrow passage-ways between the adjacent sides of said cones, an inlet supply for the liquid to be heated arranged to discharge onto the top surface of the upper cone and flow through apertures in the hub of said upper cone to the space between the cones, out through said space and down through the space between the lower cone and the bottom of the vessel to the central receiving chamber, a heating agent supply arranged to discharge within the lower cone and flow outwardly over the bottom thereof and back to its center, over a centrally arranged partition therein, up through passage-ways leading into the adjacent cone, out over the bottom of said cone and back over a centrally arranged partition therein to the center of said cone, and out through passage-ways in the top of the hub of the upper cone to the discharge pipe, whereby the liquid to be heated and the heating agent flow in opposite directions, substantially as set forth.

3. In a liquid heater, the combination of the outer casing having an inclined bottom and formed with a central receiving chamber, a discharge pipe leading therefrom, a series of hollow cones arranged one above the other within said casing with narrow passage-ways between them and between the lower cone and the bottom of said casing, partitions arranged within said cones extending from the hubs thereof to near their outer edges dividing said cones into narrow passage-ways leading from the upper chamber of one cone into the lower chamber of the next cone above, a central tube extending through the hubs of said several cones to above the normal level of the liquid to be heated, a tube on the hub of the upper cone surrounding said central tube and extending above the top thereof, said hub being formed with passage-ways leading from the upper chamber therein into said tube, a discharge tube connected with the lower end of said central tube, an inlet supply pipe for the heating agent connected with the lower chamber of the lower cone, an inlet pipe for the liquid to be heated arranged to discharge the liquid onto the top surface of the upper cone to flow through passage-ways near the center of said upper cone to between said cones, and between the lower cone and the bottom of the casing, to the discharge pipe, substantially as set forth.

4. In a liquid heater, the combination of the casing, a central tube extending up from the center of the bottom of said casing, hollow cones formed with hubs mounted one above the other on said central tube, a passage-way for the heating agent being formed through said cones from the center of the lower cone to its outer edge and back to its center, then into the next cone above, and back and forth through the succeeding upper cones until it discharges into said central tube, an inlet pipe for the liquid to be heated arranged to discharge onto the top surface of the upper cone, passage-ways for said liquid being formed through the hub of the upper cones to between the cones and from between the cones to between the lower cone and the bottom of the vessel, substantially as set forth.

5. In a liquid heater, the combination of the outer casing, the several cones arranged one above the other within said casing and tapered toward the center with passage-ways for the liquid to be heated to flow through the top surface of the upper cone through its hub over the top surface of the adjacent cone and over the bottom of the casing to the central receiving chamber, said cones being formed with passage-ways leading from near their centers to their outer edges and back and discharging through a central tube projecting through their several hubs, the heating agent inlet supply pipe connected with said passage-way and the liquid to be heated supply pipe arranged to discharge onto the top surface of the upper cone, substantially as set forth.

6. A liquid heater comprising the outer vessel, the hollow cones arranged therein with passage-ways for the heating agent and for the liquid to be heated, the heating agent supply pipe connected to its passage-way through the under side of the lower cone, the liquid to be heated supply pipe arranged to discharge on the top of the upper cone, a valve for said pipe, and a float for operating said valve connected thereto and mounted within the vessel, substantially as set forth.

7. A liquid heater comprising the outer vessel, the several cones mounted therein and arranged one above the other, a passage-way being formed through the upper cone to the bottom of the vessel extending over the surface of the intermediate cones, a drain-hole through the hub of the lower cone, a plug for controlling it, the heating agent supply connected to a passage extending over the interior surfaces of said cones from the center of the bottom of the lower cone to the center of the top of the upper cone, the liquid to be heated supply pipe arranged to discharge on the surface of the upper cone into the passage-way leading into the bottom of the vessel over the outer surface of said cones, and a discharge pipe leading from said vessel, substantially as set forth.

8. In a liquid heater, the combination of the vessel, the hollow cones mounted therein formed with passage-ways for the heating agent and for the liquid to be heated, the lower cone being formed with a drain-hole in its hub communicating with the passage-way for the liquid to be heated, a plug for controlling said drain-hole, the heating agent supply, and the liquid to be heated supply, substantially as set forth.

In witness whereof, I, have hereunto set my hand and seal at Westgrove, Pa., this 14th day of January, A. D. nineteen hundred and nine.

HENRY C. ROOT. [L. S.]

Witnesses:
J. W. KELLNER,
R. WALTER CHEYNEY.